United States Patent
Yu et al.

(10) Patent No.: US 8,797,874 B2
(45) Date of Patent: Aug. 5, 2014

(54) APPARATUS AND SYSTEM FOR PACKET ROUTING AND FORWARDING IN AN INTERIOR NETWORK

(75) Inventors: Yang Yu, San Ramon, CA (US); Delei Yu, Beijing (CN); Jianwei Guo, Beijing (CN); Robert Tao, San Jose, CA (US); Ming Li, Cupertino, CA (US)

(73) Assignee: Futurewei Technologies, Inc., Plano, TX (US)

( * ) Notice: Subject to any disclaimer, the term of this patent is extended or adjusted under 35 U.S.C. 154(b) by 165 days.

(21) Appl. No.: 13/229,197

(22) Filed: Sep. 9, 2011

(65) Prior Publication Data

US 2013/0064088 A1    Mar. 14, 2013

(51) Int. Cl.
   *H04L 12/26*    (2006.01)
(52) U.S. Cl.
   USPC .......................................... 370/235; 370/229
(58) Field of Classification Search
   USPC .................................................. 370/235, 229
   See application file for complete search history.

(56) References Cited

U.S. PATENT DOCUMENTS

| | | | |
|---|---|---|---|
| 5,774,660 A | 6/1998 | Brendel et al. | |
| 5,787,250 A | 7/1998 | Badovinatz et al. | |
| 7,039,694 B2 | 5/2006 | Kampe et al. | |
| 7,136,924 B2 | 11/2006 | Dauger | |
| 7,203,944 B1 | 4/2007 | van Rietschote et al. | |
| 7,379,465 B2 * | 5/2008 | Aysan et al. | 370/409 |
| 7,421,578 B1 | 9/2008 | Huang et al. | |
| 7,424,014 B2 * | 9/2008 | Mattes et al. | 370/389 |
| 7,436,838 B2 * | 10/2008 | Filsfils et al. | 370/395.31 |
| 7,536,476 B1 * | 5/2009 | Alleyne | 709/238 |
| 7,586,899 B1 * | 9/2009 | Mohaban et al. | 370/352 |
| 2003/0108041 A1 * | 6/2003 | Aysan et al. | 370/389 |
| 2004/0064568 A1 | 4/2004 | Arora et al. | |
| 2004/0073933 A1 | 4/2004 | Gollnick et al. | |
| 2005/0138204 A1 * | 6/2005 | Iyer et al. | 709/242 |
| 2005/0267943 A1 | 12/2005 | Castaldi et al. | |
| 2006/0056383 A1 | 3/2006 | Black et al. | |
| 2006/0155802 A1 | 7/2006 | He et al. | |
| 2006/0200579 A1 * | 9/2006 | Vasseur et al. | 709/238 |

(Continued)

FOREIGN PATENT DOCUMENTS

WO    0182678 A2    11/2001

OTHER PUBLICATIONS

Tahir, M., et al., "Cisco IOS XR Fundamentals," Cisco Press, 2009, 506 pages.

(Continued)

*Primary Examiner* — Yemane Mesfin
*Assistant Examiner* — Jeff Banthrongsack
(74) *Attorney, Agent, or Firm* — Conley Rose, P.C.; Grant Rodolph; Brandt D. Howell

(57) ABSTRACT

An apparatus comprising a network node coupled to an internal network comprising a plurality of internal nodes and configured to forward a packet designated to the internal network based on service reachability information that indicates at least one of the internal nodes for forwarding the packet to, wherein the service reachability information is sent and updated in a dynamic manner by the internal network. Also included is a network apparatus implemented method comprising receiving service reachability information from an internal network, maintaining the service reachability information in an interior Forwarding Information Base (iFIB), receiving a packet with a public destination address associated with the internal network; and forwarding the packet to appropriate locations in the internal network using the service reachability information in the iFIB.

25 Claims, 10 Drawing Sheets

(56) References Cited

U.S. PATENT DOCUMENTS

| | | | |
|---|---|---|---|
| 2007/0058568 A1* | 3/2007 | Previdi et al. | 370/254 |
| 2007/0091796 A1* | 4/2007 | Filsfils et al. | 370/228 |
| 2007/0244962 A1 | 10/2007 | Laadan et al. | |
| 2007/0280245 A1* | 12/2007 | Rosberg | 370/392 |
| 2008/0046890 A1* | 2/2008 | Dunlap et al. | 718/104 |
| 2008/0104608 A1 | 5/2008 | Hyser et al. | |
| 2008/0209067 A1 | 8/2008 | John et al. | |
| 2008/0270610 A1* | 10/2008 | John et al. | 709/226 |
| 2008/0285463 A1* | 11/2008 | Oran | 370/241 |
| 2008/0310334 A1* | 12/2008 | Nakamura et al. | 370/310 |
| 2009/0063665 A1* | 3/2009 | Bagepalli et al. | 709/222 |
| 2009/0063686 A1 | 3/2009 | Schmidt et al. | |
| 2009/0073996 A1* | 3/2009 | Swallow et al. | 370/401 |
| 2012/0136944 A1 | 5/2012 | Stewart et al. | |
| 2012/0137012 A1 | 5/2012 | Stewart et al. | |
| 2012/0209989 A1 | 8/2012 | Stewart et al. | |

OTHER PUBLICATIONS

Tanenbaum, A., et al., "Distributed Systems Principles and Paradigms, Second Edition," Pearson/Prentice Hall, 2007, 704 pages.

Stewart, R., et al., "Internal Router Capability Protocol (IRCP)," draft-stewart-xxxx-ircp-00.txt, Jan. 21, 2011, pp. 1-28.

Bradner, S., "Key Words for Use in RFC's to Inicate Requirement Levels," RFC 2119, Mar. 1997, pp. 1-3.

Ramakrishnan, K., et al., "A Proposal to Add Explicit Congestion Notification (ECN) to IP," RFC 2481, Jan. 1999, pp. 1-26.

Stewart, R., et al., "Stream Control Transmission Protocol," RFC 2960, Oct. 2000, pp. 1-126.

Ramakrishnan, K., et al., "The Addition of Explicit Congestion Notification (ECN) to IP," RFC 3168, Sep. 2001, pp. 1-64.

Stewart, R., "Stream Control Transmission Protocol," RFC 4960, Sep. 2007, pp. 1-153.

Rodrigues, L., et al., "A Low Level Processor Group Membership Protocol for LANS," Technical University of Lisboa, 1993, pp. 541-550.

Foreign Communication From a Related Counterpart Application, International Search Report, PCT/US2011/031252, Aug. 22, 2011, pp. 1-5.

Foreign Communication From a Related Counterpart Application, Written Opinion, PCT/US2011/031252, Aug. 22, 2011, pp. 1-7.

Foreign Communication From a Related Counterpart Application, International Search Report, PCT/US2011/031258, Jul. 5, 2011, pp. 1-4.

Foreign Communication From a Related Counterpart Application, Written Opinion, PCT/US2011/031258, Jul. 5, 2011, pp. 1-9.

Foreign Communication From a Related Counterpart Application, International Search Report, PCT/US2011/031261, Jul. 4, 2011, pp. 1-4.

Foreign Communication From a Related Counterpart Application, Written Opinion, PCT/US2011/031261, Jul. 4, 2011, pp. 1-9.

Office Action dated Mar. 14, 2013; U.S. Appl. No. 13/080,172, filed Apr. 5, 2011, 31 pages.

Office Action dated Mar. 25, 2013; U.S. Appl. No. 13/080,172, filed Apr. 5, 2011, 30 pages.

Office Action dated Mar. 22, 2013; U.S. Appl. No. 13/080,248, filed Apr. 5, 2011, 31 pages.

* cited by examiner

APPARATUS AND SYSTEM FOR PACKET ROUTING AND FORWARDING IN AN INTERIOR NETWORK

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Some networks or systems, such as multi-chassis core routers and data centers, comprise interior networks that have relatively complicated topological and logical control planes. For example, a multi-chassis core router, e.g., a carrier grade core router, comprises multiple route processors (RPs) that form an interior network or a router cluster. The router cluster forwards data between different line cards (LCs) across the multi-chassis core router. Similarly, a data center comprises a plurality of servers that form an interior network or a server cluster. The server cluster forwards data between different edge nodes across the data center. Such interior networks, e.g., router clusters or server clusters, forward data, such as Internet Protocol (IP) packets or other type of packets, using a control plane.

SUMMARY

In one embodiment, the disclosure includes an apparatus comprising a network node coupled to an internal network comprising a plurality of internal nodes and configured to forward a packet designated to the internal network based on service reachability information that indicates at least one of the internal nodes for forwarding the packet to, wherein the service reachability information is sent and updated in a dynamic manner by the internal network In another embodiment, the disclosure includes a network component comprising a receiver configured to receive service reachability information from an internal network that comprises a plurality of internal devices that are coupled to a plurality of edge and/or forwarding devices and a plurality of packet flows designated to the internal network, a logic unit configured to maintain the service reachability information in an interior Forwarding Information Base (iFIB) and process the packet flows for forwarding to the internal network based on the iFIB, and a transmitter configured to send the packet flows to the individual internal networks according to the service reachability information in the iFIB.

In yet another embodiment, the disclosure includes a network apparatus implemented method comprising receiving service reachability information from an internal network, maintaining the service reachability information in an iFIB, receiving a packet with a public destination address associated with the internal network; and forwarding the packet to appropriate locations in the internal network using the service reachability information in the iFIB.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Typically, in a multi-chassis core router or a data center, data is transferred by an interior network in a static manner, e.g., by pre-configuring the line cards or edge nodes. For example, the line cards or edge nodes may be statically pre-configured to forward IP packets to a cluster or RPs or servers, e.g., based on a public IP address without specifying to which individual RPs or servers. Such scheme may not be scalable and/or may have relatively low performance, since the cluster or internal network may comprise a substantially large number of RPs or servers. The terms internal and interior are referred to herein interchangeably. Hence, an improved scheme for data or IP traffic forwarding across the RPs and servers may be advantageous or desirable.

Disclosed herein is a system and method for forwarding data, e.g., IP or other packets, to internal networks, such as in multi-chassis core routers and data centers, with improved efficiency, performance, and scalability. The system and method comprises defining service reachability to edge devices, such as LCs that forward traffic to RPs in multi-chassis core routers and similarly to edge nodes and forwarding nodes that forward traffic in data centers. The service reachability may be advertised in a dynamic manner to the edge devices by the internal network, e.g., the RPs and servers, and may be used by the edge devices to establish iFIBs. Different forwarding schemes may be used to forward the service reachability information from the internal network to the edge devices. Different forwarding processes may also be used to forward the traffic from the edge nodes to the routers or servers in the internal network according to the service reachability information. Such system and method for defining service reachability and forwarding data accordingly may be dynamic, support multi-destination forwarding, support network overlay and forwarding, and allow forwarding flow with finer granularity.

Figure 1:
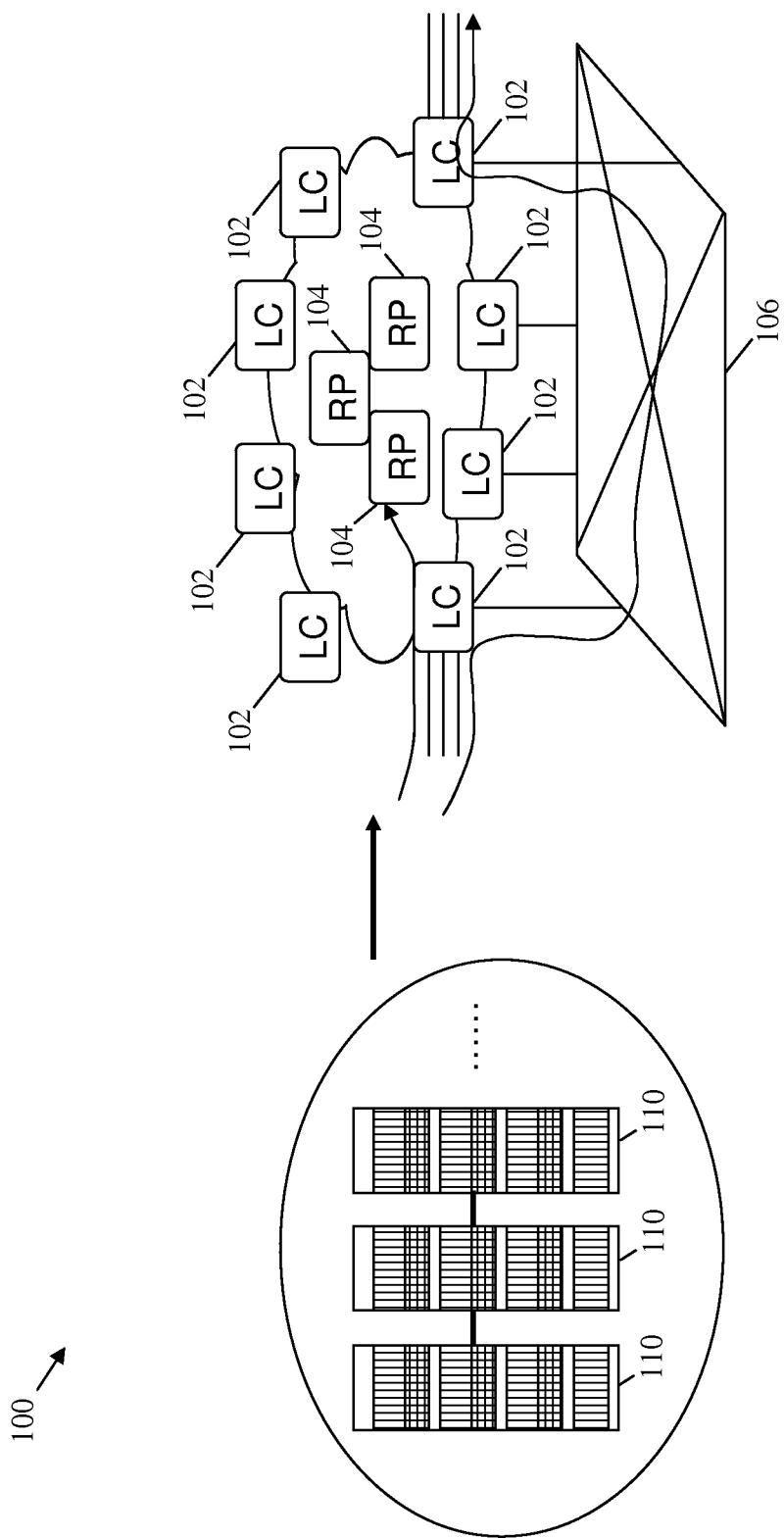
FIG. 1 is a schematic diagram of an embodiment of a multi-chassis core router.

FIG. 1 illustrates an embodiment of a multi-chassis core router 100, which may comprise a plurality of router chassis 110. The router chassis 110 may be located in a network or core network, such as in a network node, router node, or server node, and may be configured to receive, process, and/or forward data or network traffic, such as IP packets. The router chassis 110 may comprise a plurality of LCs 102 coupled to a plurality of RPs 104, which may be logically linked or grouped internally with respect to the LCs 102. The LCs 102 may be configured to forward the traffic to or via the RPs 104 across the multi-chassis core router 100. The traffic may be forwarded from one or more first or ingress LCs 102 (on one end of the multi-chassis core router 100) to one or more RPs 104, such as a cluster of RPs 104. In some cases, the traffic may be subsequently forwarded to one or more second or egress LCs 102 (on another end of the multi-chassis core router 100).

The RPs 104 may be processor cards that are logically connected to one another and to the LCs 102, e.g., via Ethernet links. The group of interconnected RPs 104 may form a cluster of router units that receives traffic from the ingress LCs 102, e.g., based on a public address, processes traffic data, and/or sends traffic to the egress LCs 102. For example, some packets such as border gateway protocol (BGP), open shortest path first (OSPF), and intermediate system to intermediate system (ISIS) packets may be sent from the LCs 102 to the RPs 104, where they are processed and terminated. Typically, the traffic may be transferred between the LCs 102 via the RPs 104 using a control/forwarding plane 106, which may use overlay. The control/forwarding plane 106 may implement a forwarding protocol/encapsulation scheme to transport the traffic across the multi-chassis core router 100 including the cluster of RPs 104. The LCs 102 may also communicate with other devices or network components (not shown) outside the multi-chassis core router 100 using packets, frames, TLVs, or any data types.

Figure 2:
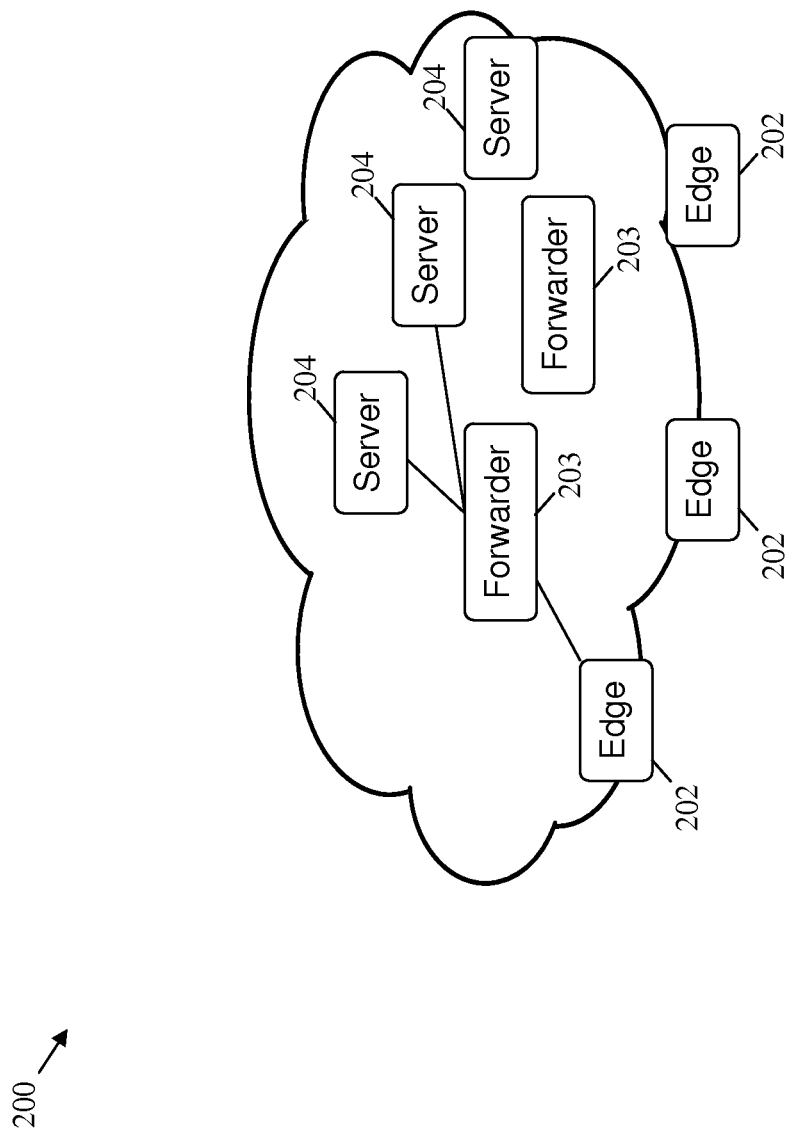
FIG. 2 is a schematic diagram of another embodiment of a data center.

FIG. 2 illustrates an embodiment of a data center 200, which may comprise a plurality of nodes. The nodes may be connected in a network or a service instance, e.g., a VLAN, and may be configured to receive, process, and/or forward network traffic, such as IP packets, and/or other services. The data center 200 may comprise a plurality of edge nodes 202, forwarding nodes 203, and servers 204. The edge nodes 202 and forwarding nodes 203 may be configured to receive and forward the traffic to the servers 204 for processing or via the servers 204 across the data center 200. The traffic may be forwarded from the edge nodes 202 and the forwarding nodes 203 to one or more servers 204, such as a cluster of servers 204 that may be logically grouped in an internal network. The traffic may be sent to the cluster of servers 204, e.g., based on a public address, without designating which individual servers 204 to receive the traffic. The forwarding nodes 203 and the edge nodes 202 may also receive and forward traffic from the cluster of servers 204. The edge nodes 202 may also communicate with external networks or nodes (not shown) using packets, frames, TLVs, or any data types.

In prior or current forwarding schemes of the multi-chassis core router 100 and similarly the data center 200, the LCs 102 and edge nodes 202/forwarding nodes 203 may forward the traffic or services in a static manner without being aware of the individual RPs 104 and servers 204. For instance, the LCs 102 and edge nodes 202/forwarding nodes 203 may use a public IP to send the traffic or services to the cluster of RPs 104 or servers 204 instead of using individual IP addresses of the RPs 104 and servers 204. As such, the cluster of RPs 104 or servers 204 may be pre-configured to internally handle, process, and/or forward different types of traffic and services. Alternatively, the LCs 102 and edge nodes 202/forwarding nodes 203 may be statically pre-configured to forward different types of traffic and services to corresponding RPs 104 and servers 204 that may be fixed. Such static schemes may not allow efficient load balancing among the RPs or servers in the cluster and service migration between RPs 104 and servers 204.

In an embodiment, to improve scalability and performance in the multi-chassis core router 100 and the data center 200, a forwarding scheme based on defining service reachability may be implemented. Specifically, service reachability information may be defined and sent from the internal network, e.g., the RPs 104 and similarly the servers 204, to establish accordingly iFIBs at the edge or forwarding devices, e.g., the LCs 102 and the edge nodes 202/forwarding nodes 203. The information obtained in the iFIBs may then be used to forward packets or other traffic to appropriate and corresponding RPs 104 and servers 204 as indicated by the service reachability information. The service reachability information may provide templates, guidelines, and/or criteria that may be used by the LCs 102 and the edge nodes 202/forwarding nodes 203 to decide where to send the traffic, e.g., to determine which RPs 104 and servers 204 to send traffic to. The information in the iFIBs may be used to classify different packets, identify packet flow forwarding patterns in the internal network, and forward the packets accordingly. Such scheme may be dynamic since the service reachability information may be updated at the LCs 102 or the edge nodes 202/forwarding nodes 203 by the internal network of RPs 104 or servers 204, respectively, e.g., upon demand or request. The traffic forwarding may be based on the network forwarding schemes and support network overlay. The scheme may also allow efficient load balancing of traffic and service migration, e.g., among the RPs 104 and the servers 204. The dynamic forwarding and efficient load balancing and migration may lead to improved scalability and performance for such systems.

Figure 3:
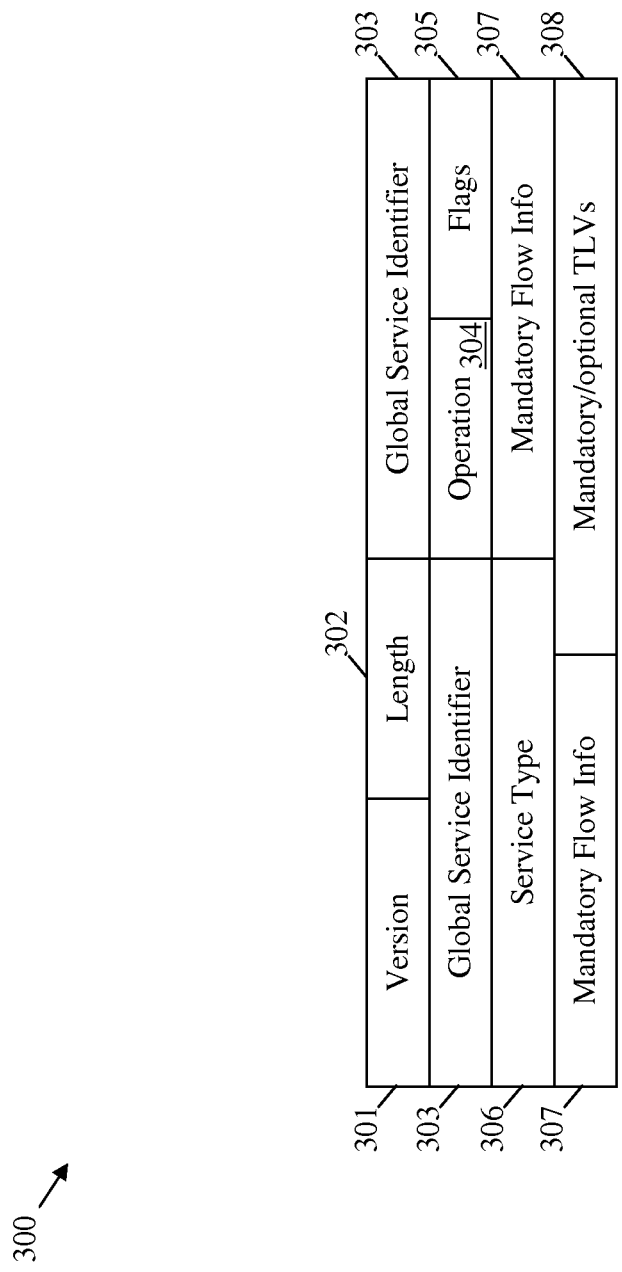
FIG. 3 is a schematic diagram of an embodiment of a service reachability message.

FIG. 3 illustrates an embodiment of a service reachability message 300, which may be sent to a LC 102, an edge node 202, or a forwarding node 203, e.g., by a RP 104 or a server 204. The service reachability message 300 may be used to instantiate a service description template at the LC 102, edge node 202, or forwarding node 203, e.g., in an iFIB. The service reachability message 300 may comprise a version field 301, a length field 302, a global service identifier (GSI) field 303, an operation field 304, a plurality of flags 305, a service type field 306, a mandatory flow information field 307, and one or more mandatory/optional TLVs 308.

The version field 301 may indicate the version of the service reachability message 300 and may have a size of about two bytes. The length field 302 may indicate the length (e.g., in bytes) of the service reachability message 300 and may have a size of about two bytes. The GSI field 303 may uniquely identify a service indicated in the service reachability message 300 and may have a size of about four bytes. A service may have multiple flows, which may share the same GSI. A service may also need to run on multiple servers or RPs, which may share the same GSI. The operation field 304 may indicate the operation or process to be implemented on the service flow and may have a size of about two bytes. The flags 305 may comprise about 16 bits (e.g., labeled from 0 to 15) and may have a size of about two bytes. As described in Table 1, the flags 305 may comprise a multi-destination flag that indicates if the packets are forwarded to multiple destinations, and an overlay flag that indicates if the packets are forwarded using overlay, e.g., an encapsulation scheme. The service type field 306 may indicate the type of service or packets that are forwarded and may have a size of about four bytes.

TABLE 1

Flags

| Flag Number | Item | Description |
|---|---|---|
| 1 | Multi-Destination | 0, no multi-destination for the flow |
| | | 1, allow multi-destination for the flow |
| 2 | Overlay-Flag | 0, default, forwarding hop by hop |
| | | 1, encapsulating for in-coming packet |

The mandatory flow information field 307 may comprise information that identifies the service flow. A flow may comprise at least one mandatory flow and optionally one or more secondary flows. For instance, the mandatory flow may be identified using IP 5 tuples. The mandatory flow information field 307 may also comprise Ethernet MAC information, User Datagram Protocol (UDP)/Transmission Control Protocol (TCP) payload, and/or other flow related information. The mandatory flow information field 307 may also comprise service or service flow location information, which may include the server or router location where the service is provided. The server location may be indicated by an IP address, Ethernet MAC address, or both. The mandatory/optional TLVs 308 may comprise additional service/flow information and/or more details about service reachability, such as a pattern that defines an expected position of a packet. The pattern may describe a flow in more details, e.g., by separating an IP 5 tuple flow into a finer granularity flow. Table 2 describes some of the information in the mandatory/optional TLVs 308.

TABLE 2

Mandatory/Optional TLVs

| Value | Type | Attribute | Description |
|---|---|---|---|
| 1 | Service Location | Mandatory | Service Location |
| 2 | Ingress Interface | Optional | Ingress Interface Identifier |
| 3 | Pattern | Optional | If service flow header still cannot differentiate the ingress packets, then pattern is used to provide addition information |
| 4 | Description | Optional | String description of services |

Figure 4:
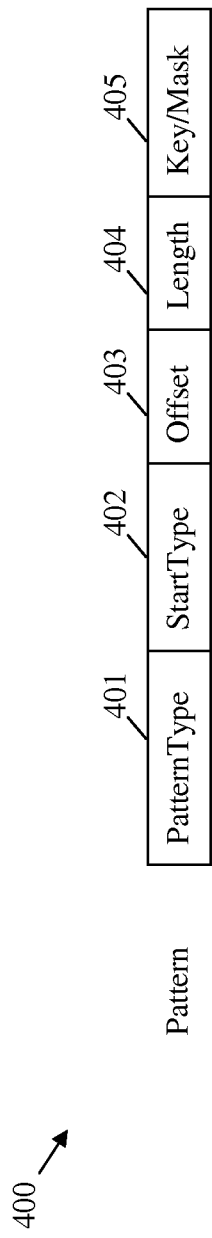
FIG. 4 is a schematic diagram of an embodiment of a pattern Type-Length-Value (TLV).

FIG. 4 illustrates an embodiment of a pattern TLV 400, which may be part of the mandatory/optional TLVs 308. As described above, the pattern TLV 400 may be used to describe a flow in more detail or with finer granularity. The pattern TLV 400 may comprise a pattern type field 401, a start type field 402, an offset field 403, a length field 404, and a key/mask field 405. The pattern type field 401 may indicate the type of the flow pattern. The start type field 402 may indicate the start type of the flow pattern. The offset field 403 may indicate the offset of the flow pattern. The key/mask field 405 may indicate a key or mask that is used to identify the flow pattern.

The service reachability message 300, including the pattern TLV 400, may be received by the LC 102, edge node 202, or forwarding node 203 and used to establish or update an iFIB. The iFIB may be maintained by the LC 102 and similarly the edge node 202 and forwarding node 203. The iFIB may comprise forwarding information for traffic (e.g., IP traffic) that is to be sent into the internal network, e.g., the cluster of RPs 104 or servers 204. The information in the iFIB may comprise record key information, actions information, extension information, and next hop information, which may all be obtained from the service reachability information, as described above. The record key information may indicate a mandatory flow for service reachability and an ingress interface for the corresponding flow packet. The flow may have one of three flow types: Ethernet flow, IP version 4 (IPv4) flow (at Layer 4), and IP version 6 (IPv6) flow (at layer 4). The actions information may define process instructions for an in-cloud (or in-cluster) packet, i.e., that is forwarded in the internal network. The extension information may be used to identify a more fine-grained flow, such as using sub-flows to designate the flow pattern. This may be implemented if the mandatory flow information is not sufficient to differentiate a service. The next hop information may determine the forwarding path for a packet, for instance for one of four possible cases, as shown in Table 3.

TABLE 3

Flow Forwarding Cases

| Type | | Description |
|---|---|---|
| Single Destination | The final destination address in the cloud for the packet | The address of next hop forwarding device |
| Multi-Destination | The final destination addresses in the cloud for the packet | The addresses of next hop forwarding device |

Figure 5:
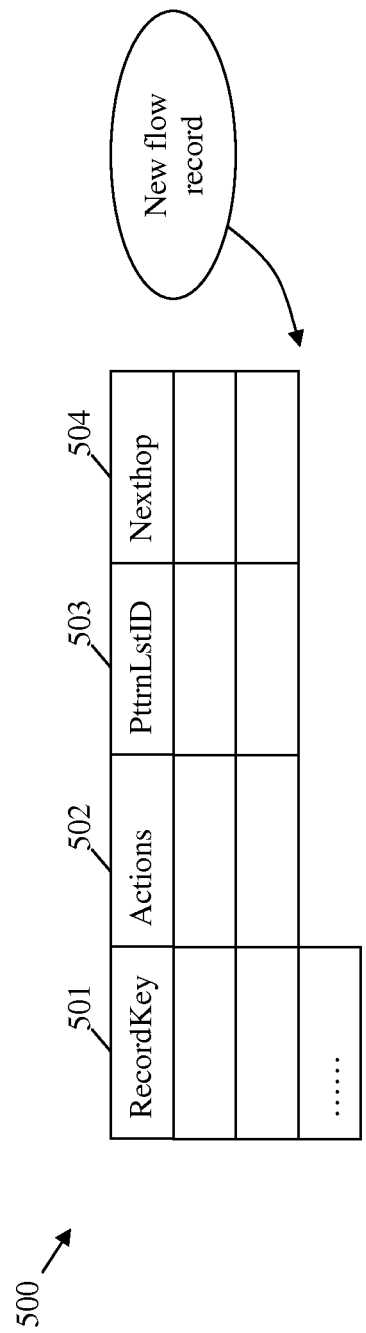
FIG. 5 is a schematic diagram of an embodiment of a flow record insertion scheme.

FIG. 5 illustrates an embodiment of a flow record insertion scheme 500, which may be used to add flow records in the iFIB. Each new flow record may be added as an entry in the iFIB and comprise information for forwarding one of the flows, e.g., as indicated by the service reachability messages 300. Each flow record may comprise a record key 501, action information 502, a pattern list ID (PttrnLstID) 503, and next hop information 504. The record key 501 may indicate the specific flow record in the iFIB. For example, the record key 501 may be an IP 5 tuple. The action information 502 may indicate any actions or behavior instruction operation for the corresponding flow. For example, the action information 502 may indicate a drop, overlay, forwarding, multi-destination, need to pattern match, or any other flow related action. If pattern match is indicated, then the flow may be separated into multiple sub-flows in pattern list ID 503. Every pattern match operation may involve several pattern positions for a packet.

The pattern list ID 503 may comprise a list of pattern IDs that may correspond to the sub-flows, as described below. The next hop information 504 may indicate the out of interface and next hop for the packet, which may be a RP 104, a server 204, or a forwarding node 203.

Figure 6:
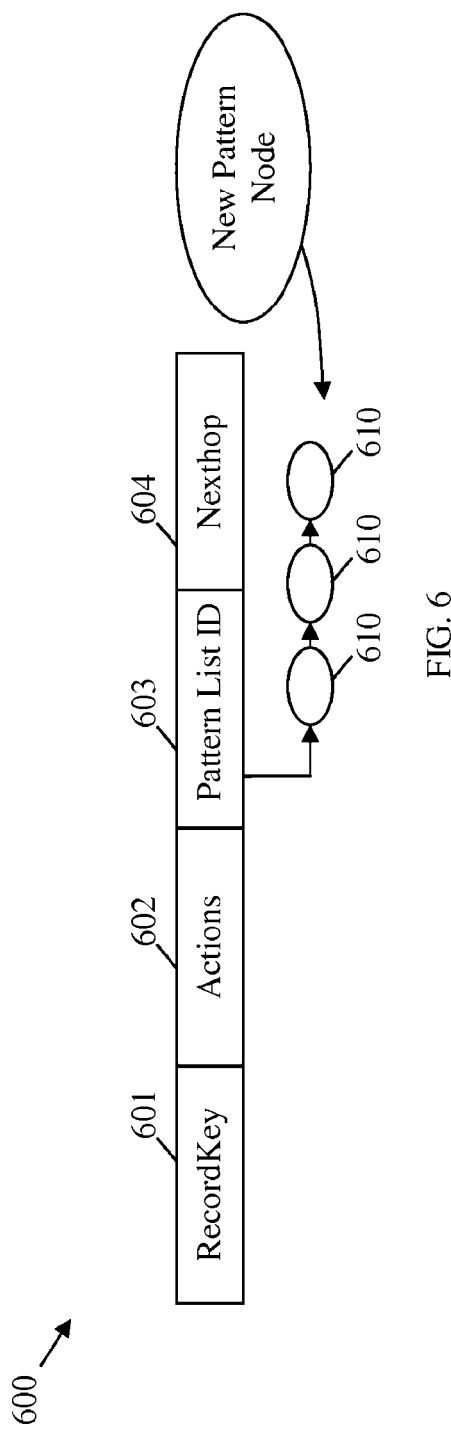
FIG. 6 is a schematic diagram of an embodiment of a pattern insertion scheme.

FIG. 6 illustrates an embodiment of a pattern insertion scheme 600, which may be used to add flow patterns in the iFIB. Each new flow pattern may be added in a flow record that comprises a record key 601, action information 602, a pattern list ID 603, and next hop information 604, which may correspond to the components of the flow record described above. The pattern list ID 603 may represent a sequence of linked and consecutive pattern nodes 610. The sequence of pattern nodes 610 indicate the locations, e.g., the nodes, that the flow packet may be forwarded along. Each packet flow between two locations or nodes represents a sub-flow of the entire packet flow. The pattern list ID 603 may be used when the action information 602 indicates a pattern match operation to forward the flow packet.

Figure 7:
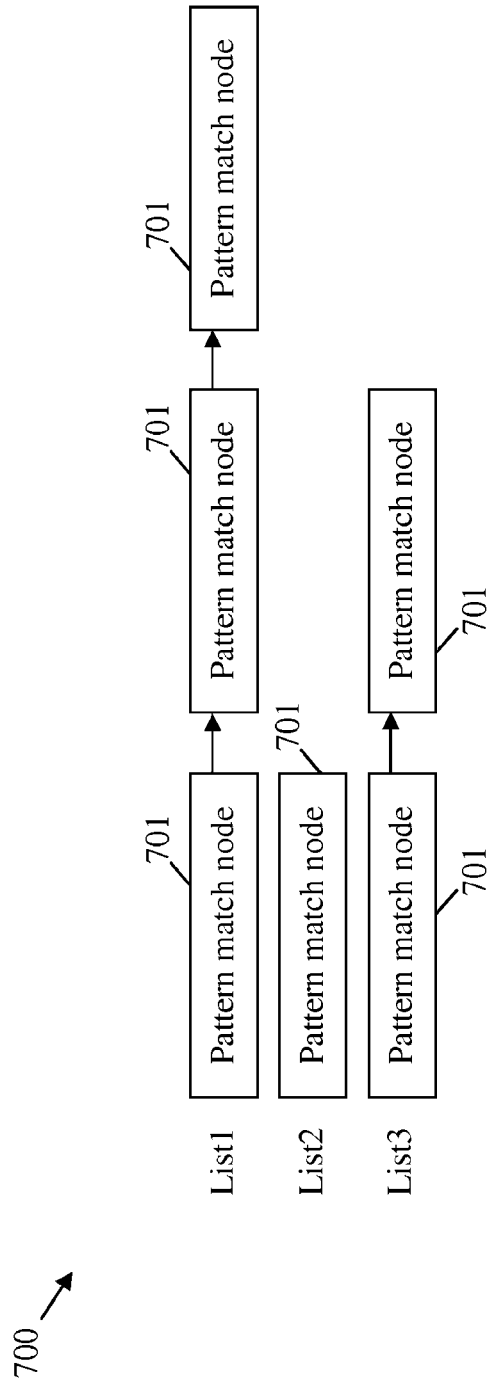
FIG. 7 is a schematic diagram of an embodiment of a pattern list.

FIG. 7 illustrates an embodiment of a pattern list 700, which may be maintained in the iFIB. The pattern list 700 may be entered in each pattern list ID 503 or 603. The pattern list 700 may comprise a sequence of linked and consecutive pattern match nodes 701, which may correspond to the pattern nodes 610. The sequence of pattern match nodes 701 may indicate the nodes that match the pattern of sub-flows for forwarding the flow packet. A LC 102, edge node 202, or forwarding node 203 may use the pattern list 700 for a flow to send the packets in the network to the proper RPs 104 or servers 204.

Figure 8:
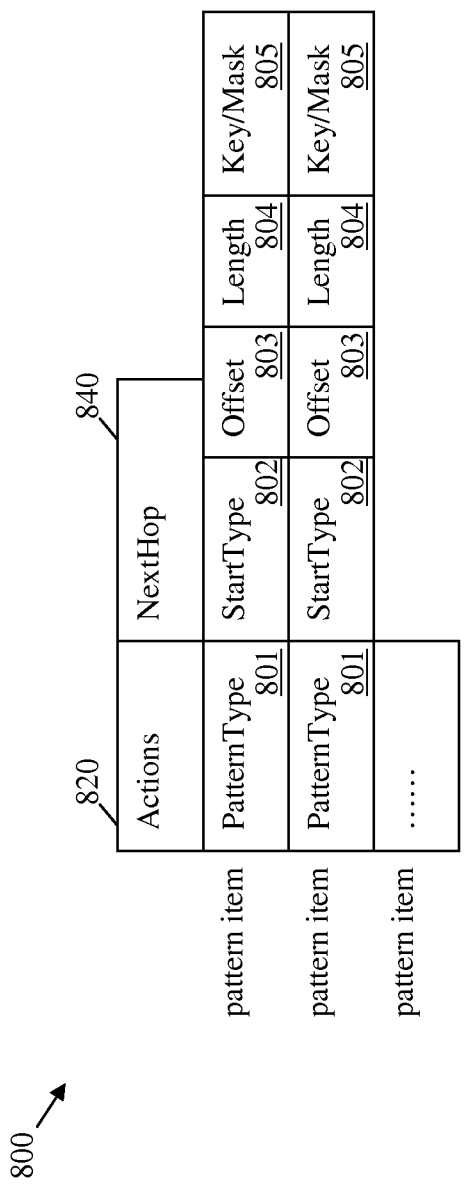
FIG. 8 is a schematic diagram of an embodiment of next hop information.

FIG. 8 illustrates an embodiment of next hop information 800, which may be maintained in the iFIB. The next hop information 800 may be included in a flow record as described above. Each flow record may comprise an entry for action 820 and next hop 840, which may correspond to a pattern item, as described above. The entry for action 820 may comprise a pattern type 801, which may match a pattern type field 401 in a pattern TLV 400 that is sent to a LC 102, edge node 202, or forwarding node 203. The entry for next hop 840 may comprise a start type 802, an offset 803, a length 804, and a key/mask 805, which may match a start type field 402, an offset field 403, a length field 404, and a key/mask field 405 that are sent in the same pattern TLV 400.

Figure 9:
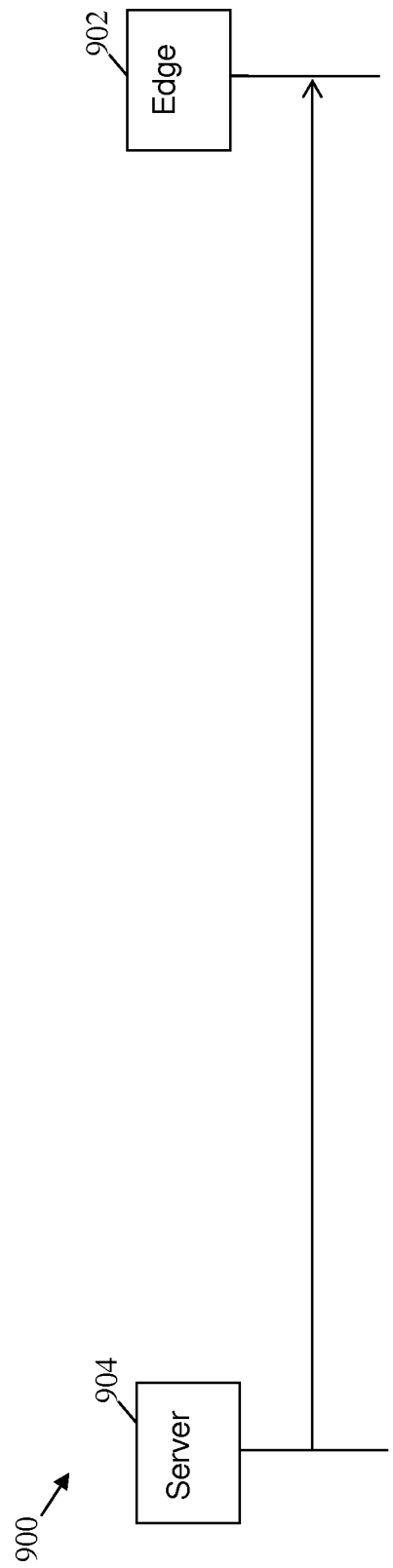
FIG. 9 is a schematic diagram of an embodiment of a service reachability forwarding scheme.

FIG. 9 illustrates an embodiment of a service reachability forwarding scheme 900, which may be used to forward service reachability information from a server 904 to an edge 902. The server 904 may correspond to a RP 104 in the multi-chassis core router 100 or to a server 204 in the data center 200. The edge 902 may correspond to a LC 102 in the multi-chassis core router 100 or to an edge node 202 or forwarding node 203 in the data center 200. The service reachability information may be sent in the service reachability message 300. Specifically, the service reachability information may be sent using multicast inter-process communication (IPC) (e.g., in a multi-chassis core router), TCP, or Stream Control Transmission Protocol (SCTP).

Figure 10:
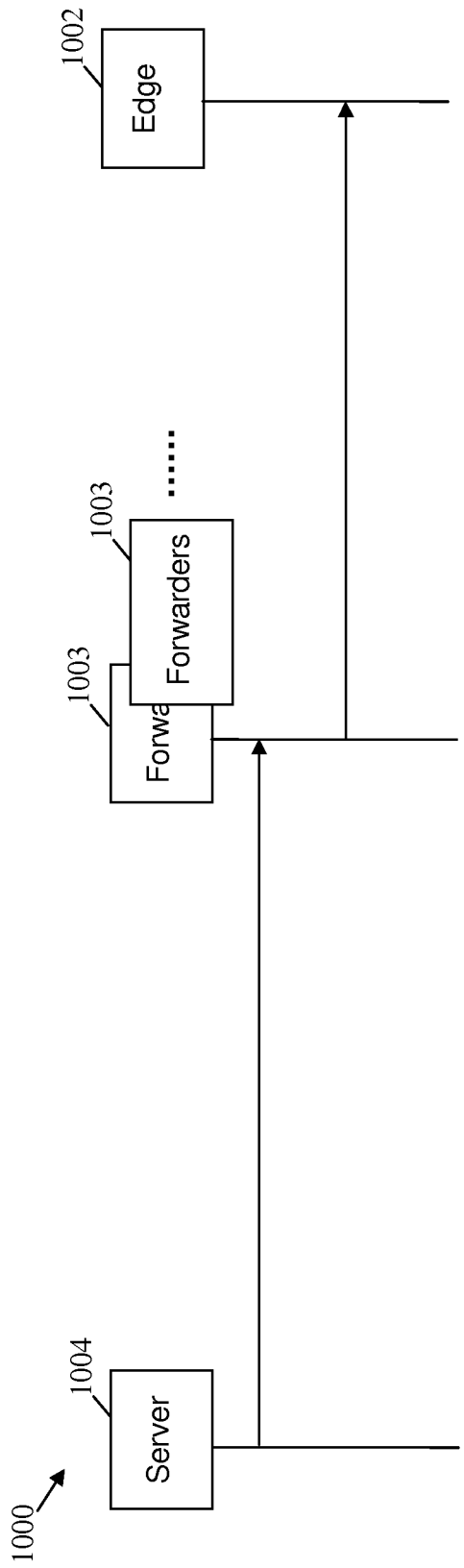
FIG. 10 is a schematic diagram of another embodiment of a service reachability forwarding scheme.

FIG. 10 illustrates an embodiment of another service reachability forwarding scheme 1000, which may be used to forward service reachability information from a server 1004 to an edge 1002 via one or more forwarders 1003. The server 1004 may correspond to a RP 104 in the multi-chassis core router 100 or to a server 204 in the data center 200. The edge 1002 may correspond to a LC 102 in the multi-chassis core router 100 or to an edge node 202 in the data center 200. The forwarders 1003 may correspond to RPs 104 and/or LCs 102 in the multi-chassis core router 100 or forwarding nodes 203 in the data center 200. The service reachability information may be sent in the service reachability message 300. Specifically, the service reachability information may be sent using a routing protocol, e.g., ISIS, overlay, a hello mechanism, or any other supported routing mechanism or protocol in the network.

Figure 11:
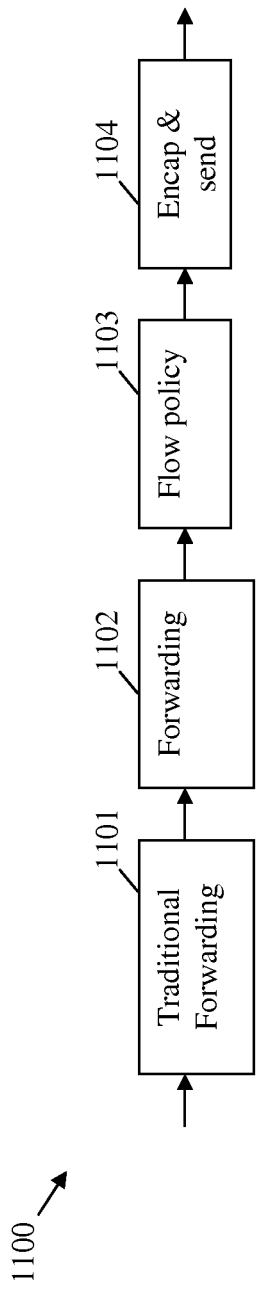
FIG. 11 is a schematic diagram of an embodiment of a packet or data forwarding scheme.

FIG. 11 illustrates an embodiment of a packet or data forwarding scheme 1100, which may be implemented in the multi-chassis core network 100 to forward packets from the LCs to the RPs 104. Similarly, the packet or data forwarding scheme 1100 may be used in the data center 200 to forward packets from the edge nodes 202/forwarding nodes 203 to the forwarding nodes 203/servers 204. At block 1101, the packets may be processed for traditional forwarding at the LCs 102 or edge nodes 202/forwarding nodes 203. For example, the packets may be processed for unicast, multicast, network supported protocols, IP forwarding schemes, routing protocols, or overlay schemes. At block 1102, the packets may be processed for forwarding from the LCs 102 or edge nodes 202/forwarding nodes 203 to the internal network. The packets may be processed for forwarding based on the service reachability information in the iFIBs to appropriate routers or servers in the internal network or cluster to improve performance (e.g., load balancing) and scalability. At block 1103, the packets may be processed according to flow policies of the network, e.g., Quality of Service (QoS) and/or other network requirements. At block 1104, the packets may be processed for proper encapsulation, based on the designated forwarding process, and then sent accordingly to the internal network.

The forwarding process, which may be implemented in block 1102 of the packet forwarding scheme 1100, may handle the packets or service flows based on the following conditions that satisfy or match:

1) the destination IP/Mask (e.g., the mask may be set to /32) of the packet;
2) the source IP/Mask of the packet;
3) the protocol ID of the packet;
4) the destination port of the packet;
5) the source port of the packet; and
6) user defined patterns (e.g., by the source or packet sender).

The above conditions may be "AND" conditions, which means before a packet reaches forwarding actions, all the conditions above must be matched. In an embodiment, the six conditions above may be split into two hierarchies. As such, in a first condition, the destination IP/Mask may be integrated into typical internal Routing Information Base (RIB)/Forwarding Information Base (FIB) that may be maintained at the LCs 102 and edge nodes 202/forwarding nodes 203. Accordingly, the internal FIB/RIB may comprise both internal addresses (individual addresses of routers or servers in the internal network or cluster) and public addresses that designate the internal network or the cluster of routers or servers as a whole. If the received packets match the internal addresses, then regular or traditional routing (e.g., in block 1101) may be used to forward the packets. Otherwise, if the public address of a packet is matched to the RIB/FIB, then additional lookup actions (e.g., in block 1102) may be used.

In an embodiment, during the packet forwarding process (e.g., in the packet or data forwarding scheme 110) the packets may be classified and forwarded using the following pseudo code or algorithm:

```
if (L2 = Ethernet) and (EthType != IP) and (EthType != Ipv6);
    then
        do L2 forwarding;
    else
        if IP_Ver== IPv4;
```

```
            then
                  do IPV4 L3 forwarding
            else if IP_Ver=IPv6;
            then
                  do IPV6 L3 forwarding
            fi
      fi
```

Figure 12:
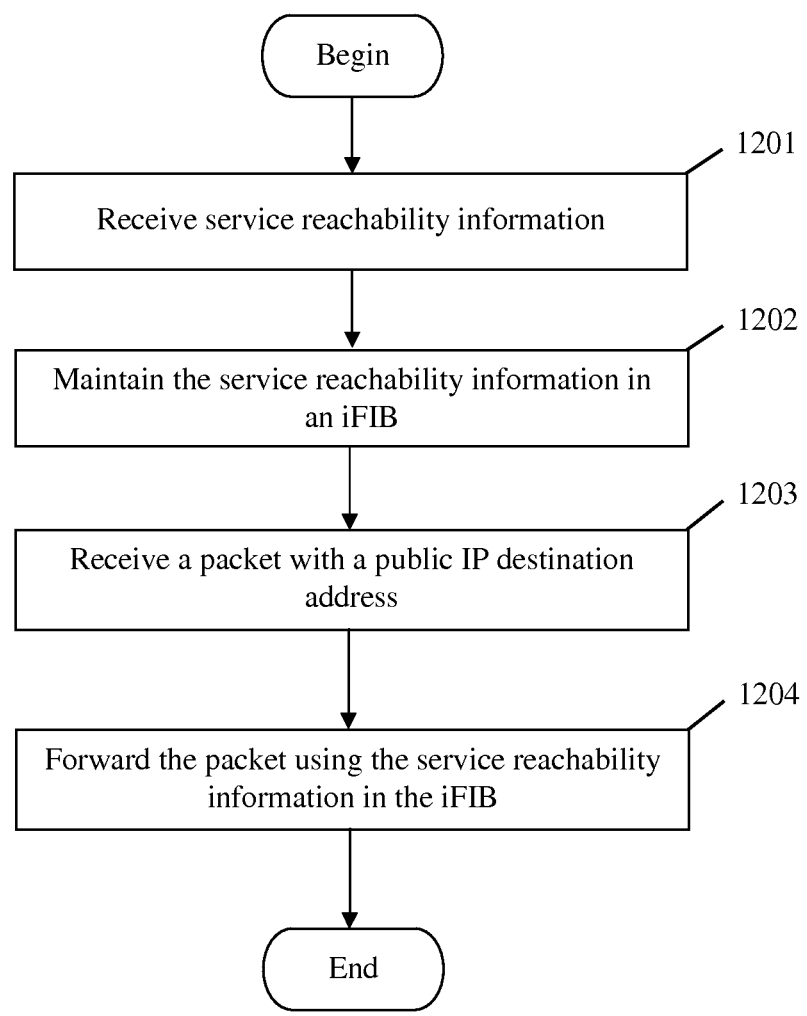
FIG. 12 is a flowchart of an embodiment of a dynamic configuration and forwarding method.

FIG. 12 illustrates an embodiment of a dynamic configuration and forwarding method 1200, which may be used to forward packets or traffic in a multi-chassis core network and data centers. The dynamic configuration and forwarding method 1200 may also be implemented in other networks that have similar architectures, e.g., that comprise edge nodes and/or forwarding nodes that receive packets with public (IP) addresses and send the packets to an internal network that comprises a plurality of internal nodes for processing the packets. The dynamic configuration and forwarding method 1200 may be implemented at the LC 102 and the edge node 202/forwarding node 203.

The method 1200 may begin at block 1201, where service reachability information may be received. The service reachability information may be sent to the LC 102 or edge node 202/forwarding node 203 by an RP 104 or server 204, respectively, or by the internal network. The service reachability information may be sent using the service reachability message 300, which may include pattern information in the pattern TLV 400. The service reachability information may be forwarded using the service reachability forwarding scheme 900 or 1000. At block 1202, the service reachability may be maintained in an iFIB, e.g., of the LC 102 or the edge node 202/forwarding node 203, as described above. At block 1203, a packet may be received with a public IP destination address. The packet may correspond to a flow indicated in the iFIB of the receiving node. The public IP destination address of the packet may be designated to the internal network of the receiving node, but may not indicate the individual address of a router or server in the internal network. At block 1204, the packet may be forwarded using the service reachability information in the iFIB. For instance, the packet may be sent to a next hop internal router or server according to an indicated pattern for forwarding the packet flow. The method 1200 may then end.

Figure 13:
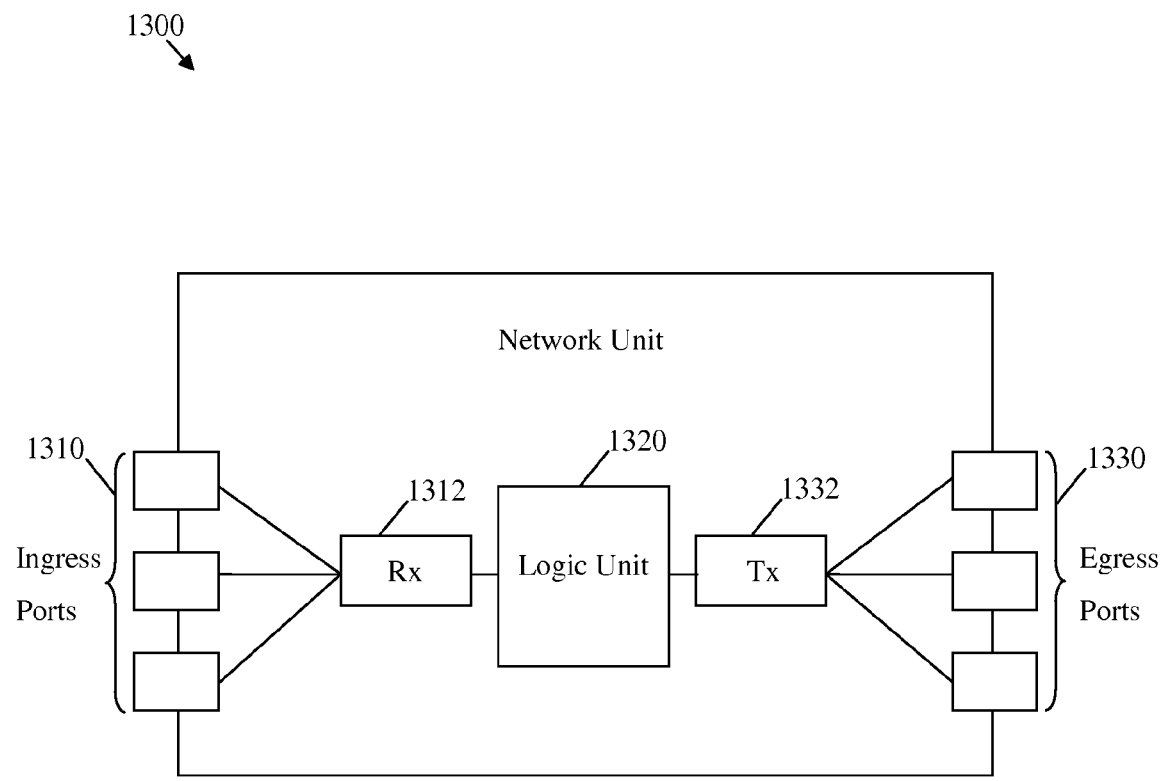
FIG. 13 is a schematic diagram of an embodiment of a network unit.

FIG. 13 illustrates an embodiment of a network unit 1300, which may be any device that transports and processes data through a network, e.g., the label switched system 100. For instance, the network unit 1300 may be located in any of the network components described above, e.g., at any one of the RPs, LCs, edge nodes, forwarding nodes, and servers. The network unit 1300 may comprise one or more ingress ports or units 1310 coupled to a receiver (Rx) 1312 for receiving packets, objects, or Type-Length-Values (TLVs) from other network components. The network unit 1300 may comprise a logic unit 1320 to determine which network components to send the packets to. The logic unit 1320 may also implement or support the dynamic configuration and forwarding method 1200, and the service reachability forwarding scheme 900 and/or 1000. The logic unit 1320 may be implemented using hardware, software, or both. The network unit 1300 may also comprise one or more egress ports or units 1330 coupled to a transmitter (Tx) 1332 for transmitting packets or data to the other network components. The components of the network unit 1300 may be arranged as shown in FIG. 13.

Figure 14:
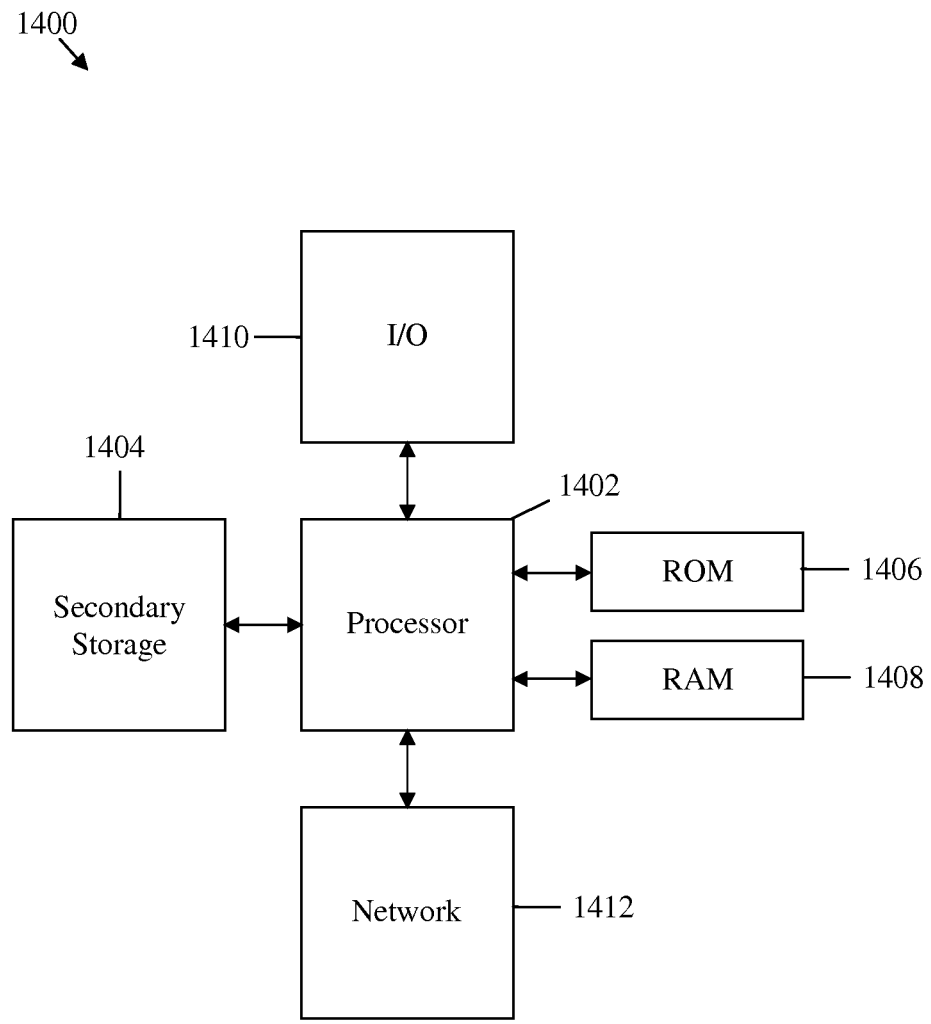
FIG. 14 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 14 illustrates a typical, general-purpose network component 1400 suitable for implementing one or more embodiments of the components disclosed herein. The network component 1400 includes a processor 1402 (which may be referred to as a central processor unit or CPU) that is in communication with memory devices including secondary storage 1404, read only memory (ROM) 1406, random access memory (RAM) 1408, input/output (I/O) devices 1410, and network connectivity devices 1412. The processor 1402 may be implemented as one or more CPU chips, or may be part of one or more application specific integrated circuits (ASICs).

The secondary storage 1404 is typically comprised of one or more disk drives or tape drives and is used for non-volatile storage of data and as an over-flow data storage device if RAM 1408 is not large enough to hold all working data. Secondary storage 1404 may be used to store programs that are loaded into RAM 1408 when such programs are selected for execution. The ROM 1406 is used to store instructions and perhaps data that are read during program execution. ROM 1406 is a non-volatile memory device that typically has a small memory capacity relative to the larger memory capacity of secondary storage 1404. The RAM 1408 is used to store volatile data and perhaps to store instructions. Access to both ROM 1406 and RAM 1408 is typically faster than to secondary storage 1404.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k * (R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
    a network node coupled to an internal network,
    wherein the internal network comprises a router, a plurality of internal nodes, and either an edge node or a forwarding node, wherein the network node is configured to forward a packet designated to the internal network based on service reachability information that indicates that the packet is to be forwarded to at least one of the internal nodes,
    wherein the packet does not identify an individual address for the at least one internal node,
    wherein the packet is forwarded to the at least one internal node using a public address based on information returned subsequent to a query of an internal logic unit,
    wherein the public address designates the internal network or a cluster of routers or servers,
    wherein the internal logic unit is configured to maintain the service reachability information in an interior Forwarding Information Base (iFIB),
    wherein the service reachability information comprises information sufficient to allow load balancing and migration between the internal nodes in the internal network,
    wherein the iFIB comprises record key information that indicates a mandatory flow for service reachability and an ingress interface for the corresponding flow, and
    wherein the mandatory flow corresponds to one of an Ethernet flow, an Internet Protocol (IP) version 4 (IPv4) flow at Layer 3, and an IP version 6 (IPv6) flow at Layer 3.

2. The apparatus of claim 1, wherein the network node is a line card in a multi-chassis core router, and wherein the internal nodes are route processors that are logically grouped in a cluster in the multi-chassis core router.

3. The apparatus of claim 1, wherein the network node is either an edge node in a data center or a forwarding node in a data center, and wherein the internal nodes are servers that are logically grouped in a cluster in the data center.

4. The apparatus of claim 1, wherein the packet is an Internet Protocol (IP) packet that has a public IP address that is associated with the internal network and not with one of the individual internal nodes.

5. The apparatus of claim 1, wherein the service reachability information provides templates that are used by the network node to determine where to send the packet in the internal network, classifies different packet flows, and identifies forwarding patterns for the packet flows.

6. The apparatus of claim 1, wherein the service reachability information comprises information sufficient to indicate forwarding the packet to a single destination or to multiple destinations in the internal network.

7. The apparatus of claim 1, wherein the service reachability information indicates whether to forward the packet using hop by hop forwarding or using an overlay encapsulation scheme.

8. A network component comprising:
    a receiver configured to receive service reachability information from an internal network, wherein the internal network comprises a plurality of internal devices, wherein the internal devices comprise a router, an ingress node, and either an edge node or a forwarding node, wherein the service reachability information comprises information sufficient to allow load balancing and migration between the internal devices, wherein the internal devices are coupled to a plurality of edge devices or forwarding devices, or both, and wherein the service reachability information indicates a plurality of packet flows designated to the internal network;
    a logic unit configured to maintain the service reachability information in an interior Forwarding Information Base (iFIB) and process the plurality of packet flows for forwarding to the internal network based on the iFIB; and
    a transmitter configured to send the plurality of packet flows to the individual internal networks according to the service reachability information in the iFIB, wherein the transmitter sends a packet flow to the internal device when the packet flow comprises an individual address for the internal device, and wherein the transmitter sends the packet flow to the internal device following a lookup action in the iFIB to identify a corresponding address when the received packet flow identifies a public address designating the individual internal network and does not identify the internal device,
    wherein the iFIB comprises record key information that indicates a mandatory flow for service reachability and an ingress interface for the corresponding flow, and
    wherein the mandatory flow corresponds to one of an Ethernet flow, an Internet Protocol (IP) version 4 (IPv4) flow at Layer 3, and an IP version 6 (IPv6) flow at Layer 3.

9. The network component of claim 8, wherein the iFIB comprises extension information that is used to identify one or more flow details using sub-flows to designate a flow pattern if the mandatory flow information is not sufficient to differentiate a service.

10. The network component of claim 8, wherein the iFIB comprises actions information that defines process instructions for forwarding packet flows in the internal network, and wherein the actions information indicates one of a drop action, an overlay or default forwarding action, a multi-destination or single destination forwarding action, and a need to pattern match action.

11. The network component of claim 8, wherein the iFIB comprises next hop information that determines a forwarding path for a packet according to one of: forwarding the packet to a single destination using a final destination address in a cloud; forwarding the packet to a single destination using an address of next hop forwarding device; forwarding the packet to multiple destinations using multiple final destination addresses in the cloud; and forwarding the packet to multiple destinations using multiple addresses of multiple next hop forwarding devices.

12. The network component of claim 8, wherein the service reachability information is sent in a service reachability message that comprises a version field, a length field, a global service identifier (GSI) field, an operation field, a plurality of flags, a service type field, a mandatory flow information field, and one or more mandatory/optional Type-Length-Values (TLVs).

13. The network component of claim 12, wherein the mandatory/optional TLVs include a pattern TLV that describes a flow in more detail with finer granularity, and wherein the pattern TLV comprises a pattern type field, a start type field, an offset field, a length field, and a key/mask field.

14. The network component of claim 8, wherein the iFIB comprises one or more flow records that each comprise a record key that corresponds to an Internet Protocol (IP) 5 tuple, action information, a pattern list identifier (ID) that represents a sequence of linked and consecutive pattern match nodes, and next hop information.

15. A network apparatus implemented method comprising:
receiving service reachability information from an internal network, wherein the internal devices comprise a router, an ingress node, and either an edge node or a forwarding node, and wherein the service reachability information comprises information sufficient to allow load balancing and migration between the internal devices;
maintaining the service reachability information in an interior Forwarding Information Base (iFIB);
receiving a packet with a public destination address associated with the internal network; and
forwarding the packet to appropriate locations in the internal network using the service reachability information in the iFIB, wherein the network node forwards the packet to the at least one internal node when the packet comprises an individual address for the at least one internal node, and the network node forwards the packet to the at least one internal node when the received packet does not identify the individual address for the at least one internal node after performing a lookup action in the iFIB using a public address designating the internal network or a cluster of routers or servers,
wherein the iFIB comprises record key information that indicates a mandatory flow for service reachability and an ingress interface for the corresponding flow, and
wherein the mandatory flow corresponds to one of an Ethernet flow, an Internet Protocol (IP) version 4 (IPv4) flow at Layer 3, and an IP version 6 (IPv6) flow at Layer 3.

16. The network apparatus implemented method of claim 15, wherein the service reachability information is sent from a server or route processor (RP) in the internal network using multicast inter-process communication (IPC), Transmission Control Protocol (TCP), or Stream Control Transmission Protocol (SCTP).

17. The network apparatus implemented method of claim 15, wherein the service reachability information is sent from a server or route processor (RP) in the internal network via one or more forwarding devices using an Intermediate System to Intermediate System (ISIS) routing protocol, overlay, or a hello mechanism.

18. The network apparatus implemented method of claim 15, wherein the packet is processed for forwarding based on a plurality of combined AND conditions that satisfy a destination Internet Protocol (IP)/Mask of the packet, a source IP/Mask of the packet, a protocol identifier (ID) of the packet, a destination port of the packet, a source port of the packet, and a user defined pattern.

19. The apparatus of claim 1, wherein the service reachability information further comprises:
an operation field indicating the operation or process to be implemented, wherein the operation field has a size of two bytes; and
a service field indicating the type of service or packets that are forwarded, wherein the service field has a size of four bytes.

20. A computer program product for use by a network node coupled to an internal network, the computer program product comprising computer executable instructions stored on a non-transitory computer readable medium such that when executed by a processor cause the network node to:
forward a packet designated to the internal network based on service reachability information that indicates that the packet is to be forwarded to at least one of a plurality of internal nodes positioned in the internal network,
wherein the packet does not identify an individual address for the at least one internal node,
wherein the packet is forwarded to the at least one internal node using a public address based on information returned subsequent to a query of an internal logic unit,
wherein the public address designates the internal network or a cluster of routers or servers,
wherein the internal logic unit is configured to maintain the service reachability information in an interior Forwarding Information Base (iFIB),
wherein the service reachability information comprises information sufficient to allow load balancing and migration between the internal nodes in the internal network,
wherein the iFIB comprises record key information that indicates a mandatory flow for service reachability and an ingress interface for the corresponding flow, and
wherein the mandatory service flow corresponds to one of an Ethernet flow, an Internet Protocol (IP) version 4 (IPv4) flow at Layer 3, and an IP version 6 (IPv6) flow at Layer 3.

21. The computer program product of claim 20, wherein the network node is a line card in a multi-chassis core router, and wherein the internal nodes are route processors that are logically grouped in a cluster in the multi-chassis core router.

22. The computer program product of claim 20, wherein the network node is either an edge node in a data center or a forwarding node in a data center, and wherein the internal nodes are servers that are logically grouped in a cluster in the data center.

23. A computer program product for use by a network component, the computer program product comprising computer executable instructions stored on a non-transitory computer readable medium such that when executed by a processor cause the network component to:
receive service reachability information from an internal network, wherein the internal network comprises a plurality of internal devices, wherein the internal devices comprise a router, an ingress node, and either an edge node or a forwarding node, wherein the service reachability information comprises information sufficient to allow load balancing and migration between the internal devices, wherein the internal devices are coupled to a plurality of edge devices, forwarding devices, or both, and wherein the service reachability information indicates a plurality of packet flows designated to the internal network;

maintain the service reachability information in an interior Forwarding Information Base (iFIB);

process the plurality of packet flows for forwarding to the internal network based on the iFIB; and send the plurality of packet flows to the internal devices according to the service reachability information in the iFIB, wherein the received packet flow identifies a public address designating the individual internal network and does not identify the internal device, and wherein sending the plurality of packet flows follows a lookup action in the iFIB to identify corresponding addresses, wherein the iFIB comprises record key information that indicates a mandatory flow for service reachability and an ingress interface for the corresponding flow, and wherein the mandatory flow corresponds to one of an Ethernet flow, an Internet Protocol (IP) version 4 (IPv4) flow at Layer 3, and an IP version 6 (IPv6) flow at Layer 3.

24. The computer program product of claim 23, wherein the iFIB comprises extension information that is used to identify one or more flow details using sub-flows to designate a flow pattern if the mandatory flow information is not sufficient to differentiate a service.

25. The computer program product of claim 23, wherein the iFIB comprises actions information that defines process instructions for forwarding packet flows in the internal network, and wherein the actions information indicates one of a drop action, an overlay or default forwarding action, a multi-destination or single destination forwarding action, and a need to pattern match action.

* * * * *